3,557,016
HEAT REVERSIBLE GEL AND METHOD
FOR PREPARING SAME
Harry R. Schuppner, Jr., El Cajon, Calif., assignor to Kelco Company, San Diego, Calif., a corporation of Delaware
No Drawing. Filed Oct. 22, 1965, Ser. No. 502,446
Int. Cl. A23l 1/04; B01j 13/00; C09g 1/02
U.S. Cl. 252—316                21 Claims

ABSTRACT OF THE DISCLOSURE

A composition for producing a synergistic increase in the viscosity of an aqueous system and for forming a heat reversible, aqueous gel comprising Xanthomonas hydrophilic colloid and locust bean gum, wherein the weight ratio of said Xanthomonas hydrophilic colloid to said locust bean gum ranges from about 95:5 to about 5:95. The viscous aqueous medium is made by adding the Xanthomonas hydrophilic colloid and locust bean gum to water. The heat reversible, aqueous gel can be made by adding a mixture of Xanthomonas hydrophilic colloid and locust bean gum to hot water, and thereafter cooling. The heat reversible, aqueous gel can also be made by adding to water a mixture of Xanthomonas hydrophilic colloid and locust bean gum, and mixing under high shear agitation.

---

This invention relates to an aqueous heat-reversible gelatinous product and to a method for producing the same. More specifically, the invention relates to an aqueous gelatinous product produced by the interaction of a Xanthomonas hydrophilic colloid with locust bean gum.

Various products such as cranberry sauce, tomato aspic, and the like are sold in the form of an aqueous gel. Prior to consumption, the products are removed from the cans or containers in which they are sold and placed in a serving dish which is then placed on the table. In placing the products on the table, the housewife will, of course, arrange them in an attractive manner such that their appearance is appetizing and contributes to the overall appearance of the dinner table.

The housewife may frequently desire to serve a gelled product in the form of a decoratively molded article. This can be conveniently accomplished, for example, in the case of a gelation salad or dessert by mixing the salad or dessert ingredients in a hot fluid state and thereafter placing them in a suitable mold which is then placed under refrigeration and cooled to form the salad or dessert.

Although gelled salads or desserts may be conveniently prepared in decorative molds, it is frequently desirable to purchase a material in the form of a gel which is heat reversible. Thus, even though the gel may be broken in removing it from the container in which it is supplied, the gel structure can be restored merely by placing the gel pieces in a suitable mold and reheating.

An object of this invention is to provide a novel heat reversible aqueous gel and a method for its preparation.

A further object of this invention is to provide a novel aqueous gelatinous composition having particular application for use as a salad or dessert gel and which can be removed from its original container and remolded to give it a different configuration.

A still further object of this invention is to provide a method for forming aqueous gels such that they are heat reversible.

Additional objects of the invention will appear from a reading of the specification and claims which follow.

In accord with my invention, I have found that I can accomplish one or more of the foregoing objectives, and in particular produce a highly desirable heat reversible aqueous gel with the products and method hereinafter described.

In a general sense, my invention involves the addition of a small quantity of a Xanthomonas hydrophilic colloid in admixture with locus bean gum to hot water. Preferably the temperature of the water ranges from about 150° to about 180° F. More preferably, the temperature of the water is approximately 180° F.

The limiting factor in water of a sufficiently high temperature is the solubility of the locust bean gum in water. Locust bean gum is sparingly soluble in water at 70° F and its solubility increases gradually above this point with increasing temperature. As stated above, a preferred temperature range for the hot water is from about 150° F. to about 180° F. The gel forming ingredients are generally held at this temperature for a time of about 15 minutes. Using higher temperatures, which may be desirable in some instances, the time may be reduced to a lesser time such as 5 minutes. The time, temperature, and the degree of agitation employed in blending the gel forming ingredients with hot water can all be varied with respect to each other so long as a sufficient quantity of the locust bean gum goes into solution in the hot water.

The total quantity of the Xanthomonas hydrophilic colloid and locust bean gum which I employ is in the range from about 0.02% to about 4% by weight of the water to which it is added. Preferably, however, the total quantity of Xanthomonas hydrophilic colloid and locust bean gum is in the range of about 0.1% to about 1% by weight of the water since I have found that superb gels are formed at concentrations within this range.

The ratios of locust bean gum to Xanthomonas hydrophilic colloid which I employ can be varied over a wide range. Thus, for example, I have found that weight ratios of Xanthomonas hydrophilic colloid to locust bean gum from about 95:5 to about 5:95 produce usable gels. Preferred weight ratios of a Xanthomonas hydrophilic colloid to locust bean gum generally range from 75:25 to 40:60.

A convenient means for employing my invention involves the formulation of a gellable composition which, when added to hot water and subsequently cooled, results in the formation of a gel. The essential ingredients in my invention, namely a Xanthomonas hydrophilic colloid and locust bean gum, are preferably mixed in dry finely divided form to give a homogeneous mixture such that they are readily soluble in water. Preferably, the particle size of the finely divided locust bean gum and Xanthomonas hydrophilic colloid is such that 100% of the ingredients will pass through a 100 mesh screen. To these essential ingredients, there may, of course, be added various conventional food ingredients such as sugar, spices, vegetable coloring materials, and the like. The optional food ingredients may be present in any desired concentration depending upon the taste characteristics desired in the gelled product.

When the optional food ingredients, as outlined above, are co-present with a Xanthomonas hydrophilic colloid and locust bean gum in a dry mix, the optional food ingredients are preferably in a finely divided comminuted form such that they are readily soluble in water. In the case, however, where my invention is employed in the forming of a heat reversible gel, the gel may contain vegetables, fruits, and the like dispersed throughout. This can be readily accomplished, for example, in the case of a dessert gel by adding a Xanthomonas hydrophilic colloid and locust bean gum to hot water in the manner described previously and then adding the fruits, vegetables, etc. after cooling to a temperature, e.g., 130° to 140° F., where the viscosity of the system is sufficiently high to suspend the solid materials which are added.

Gels which are formed according to my invention are, in general, quite cohesive. In certain use applications, a less cohesive gel would be desirable. In this event, my gel can be altered by incorporating therein small quantities of additives which would make the gel more plastic. Examples of such additives are guar gum, carboxymethyl cellulose, gum karaya, gum tragacanth, alginates, gum arabic, gum carrageenan, and starches. The quantities of such additives may be varied, as desired, to reduce the cohesiveness of my gels to whatever degree is necessary.

The Xanthomonas hydrophilic colloids employed in my invention are colloidal materials which are produced by bacteria of the genus Xanthomonas. Illustrative of such colloidal materials is the hydrophilic colloid produced by the bacterium *Xanthomonas campestris*. This colloidal material is a polymer containing mannose, glucose, potassium glucuronate and acetyl radicals. In such a colloid, the potassium portion can be replaced by several other cations without substantial change in the property of the said materials for my purpose. The said colloid, which is a high molecular weight, exocellular material, may be prepared by the bacterium *Xanthomonas campestris,* by whole culture fermentation of a medium containing 2–5% commercial glucose, organic nitrogen source, dipotassium hydrogen phosphate and appropriate trace elements. The incubation time is approximately 96 hours at 28° C., aerobic conditions. In preparing the colloid as aforesaid, it is convenient to use corn steep liquor or distillers' dry solubles as an organic nitrogen source. It is expedient to grow the culture in two intermediate stages prior to the final inoculation in order to encourage vigorous growth of the bacteria. These stages may be carried out in media having a pH of about 7. In a first stage a transfer from an agar slant to a dilute glucose broth may be made and the bacteria cultured for 24 hours under vigorous agitation and aeration at a temperature of about 30° C. The culture so produced may then be used to inoculate a higher glucose (3%) content broth of larger volume in a second intermediate stage. In this stage the reaction may be permitted to continue for 24 hours under the same conditions as the first stage. The culture so acclimated for use with glucose by the aforementioned first and second stages is then added to the final glucose medium. In the aforesaid method of preparation of *Xanthomonas campestris* hydrophilic colloid, a loopful of organism from the agar slant is adequate for the first stage comprising 200 milliliters of the said glucose media. In the second stage the material resulting from the first stage may be used together with 9 times its volume of a 3% glucose media. In the final stage the material produced in the second stage may be admixed with 19 times its volume of the final media. A good final media may contain 3% glucose, 0.5% distillers' dry solubles, 0.5% dipotassium phosphate, 0.1% magnesium sulphate having 7 molecules of water of crystallization and water. The reaction in the final stage may be satisfactorily carried out for 96 hours at 30° C. with vigorous agitation and aeration. The resulting *Xanthomonas campestris* colloidal material which I have found to be particularly suitable for my purpose can be recovered by precipitation in methanol of the clarified mixture from the fermentation. This resulting material may also be designated as a pseudoplastic, heteropolysaccharide hydrophilic colloid or gum produced by the bacterium species *Xanthomonas campestris.*

Other Xanthomonas colloidal materials may be prepared by repeating the procedure used for producing the *Xanthomonas campestris* colloidal material described above by substituting known Xanthomonas bacterium or organisms, i.e., *Xanthomonas carotae, Xanthomonas incanae, Xanthomonas begoniae,* and *Xanthomonas malvacearum,* for the bacterium, *Xanthomonas campestris.*

To illustrate the wide variety of gels which may be formed according to my invention, a series of tests were performed. In these tests, a Xanthomonas hydrophilic colloid, prepared as described previously, and locust bean gum, with both the Xanthomonas hydrophilic colloid and locust bean gum being present in finely divided form, were dry blended and added to distilled water having a temperature of 180° F. The total concentration of Xanthomonas hydrophilic colloid and locust bean gum was 1% by weight of the aqueous component. After being held at 180° F. for 15 minutes with constant agitation, each of the various mixtures was poured into Bloom Gelometer bottles and allowed to stand for 17 hours at room temperature. Each of the various samples was then checked to determine its Bloom gel strength. The results of these tests are set forth in the following table in which the first column describes the percent concentration of *Xanthomonas campestris* hydrophilic colloid based on the weight of the aqueous medium, the second column describes the percent concentration of locust bean gum based on the weight of the aqueous medium, and the third column describes the Bloom Gelometer reading for each of the samples in grams.

TABLE I

| Percent of *Xanthomonas campestris* hydrophilic colloid | Percent of locust bean gum | Bloom gelometer reading in grams |
|---|---|---|
| 0.95 | 0.05 | 15.1 |
| 0.90 | 0.10 | 21.4 |
| 0.85 | 0.15 | 26.4 |
| 0.80 | 0.20 | 31.5 |
| 0.75 | 0.25 | 42.3 |
| 0.70 | 0.30 | 40.3 |
| 0.65 | 0.35 | 39.6 |
| 0.60 | 0.40 | 42.2 |
| 0.50 | 0.50 | 41.0 |
| 0.40 | 0.60 | 40.0 |
| 0.35 | 0.65 | 34.6 |
| 0.30 | 0.70 | 29.9 |
| 0.25 | 0.75 | 26.6 |
| 0.20 | 0.80 | 23.6 |
| 0.15 | 0.85 | 18.3 |
| 0.10 | 0.90 | 15.3 |
| 0.05 | 0.95 | ---------------- |

As shown in the above table, gels were formed over a wide range of ratios of *Xanthomonas campestris* hydrophilic colloid to locust bean gum. The maximum gel strength was found to occur at weight ratios of *Xanthomonas campestris* hydrophilic colloid to locust bean gum ranging from about 75:25 to about 40:60.

The Bloom Gelometer is an instrument that is available commercially from the Precision Scientific Company, 3737 West Cortland Street, Chicago 47, Ill. It was developed by Dr. Oscar Bloom of Swift & Company and is used to determine the gel strength of food products such as gelatin desserts and starch dessert powders. The instrument is used by governments and institutions in testing not only gelatin desserts but other type gel desserts as well. In general, the instrument is a device that contains a one inch diameter Lucite plunger that is lowered a predetermined distance, usually 4 mm., into the sample. Force applied to the plunger to drive it against the resistance of the gel or jelly is a direct measure of the gel strength or jelly strength of the material tested. The result is reported in grams.

To further illustrate my invention, additional tests were performed in which a *Xanthomonas campestris* hydrophilic colloid and locust bean gum in finely divided form were dry blended and added to distilled water at a temperature of about 180° F. The total concentration of *Xanthomonas campestris* hydrophilic colloid and locust bean gum was 1% by weight of the aqueous medium with 60 parts of *Xanthomonas campestris* hydrophilic colloid being employed for each 40 parts of locust bean gum. After being added to water at 180° F., the mixture was agitated for about 15 minutes while holding the temperature constant at 180° F. Then the temperature was allowed to drop slowly with viscosity measurements being taken with a Brookfield Viscometer, Model LVF, employing a No. 3 or No. 4 spindle rotating at 60 r.p.m. The results of these tests are shown in the following table in which the first column shows the temperature of the mixture in degrees Fahrenheit and the second column shows the viscosity of the material in centipoises.

TABLE II

| Temperature, °F. | Viscosity (cps.) |
|---|---|
| 176 | 630 |
| 162 | 875 |
| 153 | 1050 |
| 145 | 1060 |
| 138 | 1160 |
| 131 | 1050 |
| 126 | 1200 |
| 122 | 1320 |
| 118 | 1625 |
| 116 | 2300 |
| 114 | 2775 |
| 111 | 3400 |
| 106 | 5500 |

As shown in the above table, a gel is formed at a temperature of approximately 118° F. at which point the viscosity rises rapidly. It has been found that the temperature of gel formation can vary slightly within the range of about 115° F. to about 125° F. with the transformation temperature being relatively independent of the exact gel composition. On reheating the gel to the transformation temperature, it has been found that the gel is transformed to a liquid at approximately the same temperature at which the liquid is originally transformed into a gel.

In still a further series of tests, a variety of temperature reversible gels were formed using various *Xanthomonas* hydrophilic colloids in admixture with locust bean gum. The procedure generally employed was to dry blend the particular Xanthomonas colloid with locust bean gum with each being in finely divided form. The dry blended mixture was then added to hot water at a temperature of 180° F. to form a mixture which was stirred for 15 minutes while maintaining the temperature at 180° F. The hot solution was then poured into a Bloom Gelometer bottle and allowed to stand for 17 hours at room temperature. Following this, gelometer readings were taken for each of the various gels by employing a 1-inch diameter Lucite plunger. The Gelometer was adjusted for a 4 mm. depression and to deliver 200±5 gms. of shot in 5 seconds. The results are set forth in the following table in which column one discloses the percent concentration of both the Xanthomonas hydrophilic colloid and the locust bean gum in terms of the weight of the aqueous medium and column two shows the Bloom Gelometer reading obtained for each of the gels. The Bloom Gelometer readings shown in column two are average figures based on three separate Bloom Gelometer readings for each of the gels.

TABLE III

| Percent of Xanthomonas hydrophilic colloid and percent of locust bean gum: | Gms.[1] |
|---|---|
| 0.50% *Xanthomonas campestris,* 0.50% locust bean gum | 40.3 |
| 0.625% *Xanthomonas malvacearum,* 0.50% locust bean gum | 77.9 |
| 0.875% *Xanthomonas carotae,* 0.50% locust bean gum | 52.6 |
| 0.825% *Xanthomonas begoniae* (St. 3), 0.50% locust bean gum | 56.6 |
| 0.55% *Xanthomonas begoniae* (St. 9), 0.50% locust bean gum | 47.4 |
| 0.75% *Xanthomonas incanae,* 0.50% locust bean gum | 37.0 |
| 1.875% *Xanthomonas phaseoli,* 0.50% locust bean gum | 44.5 |
| 1.00% *Xanthomonas campestris,* 0.00% locust bean gum | 12.7 |
| 1.00% locust bean gum, 0.00% *Xanthomonas campestris* | 10.0 |

[1] Bloom Gelometer readings.

As shown in the above table, all of the various Xanthomonas hydrophilic colloids produced firm, cohesive and thermally reversible gels. Moreover, the table shows that the gel formed from a 50:50 mixture *Xanthomonas campestris* hydrophilic colloid with locust bean gum had a gel strength which was synergistically increased over the gel strengths produced by employing either *Xanthomonas campestris* hydrophilic coilloid or locust bean gum alone. Specifically, 1% by weight of *Xanthomonas campestris* hydrophilic colloid produced a Bloom Gelometer reading of only 12.7 gms. and 1% by weight of locust bean gum produced a Bloom Gelometer reading of only 10.0 gms. Yet, unexpectedly, 0.50% of *Xanthomonas campestris* hydrophilic colloid in admixture with 0.5% of locust bean gum produced a firm, cohesive gel having a Bloom Gelometer reading of 40.3 gms. Similarly, it has been found that the Xanthomonas hydrophilic colloids other than that produced by the bacterium *Xanthomonas campestris* react synergistically with locust bean gum to produce firm, cohesive gels whose gel strengths are far in excess of that predicted from the individual actions of a Xanthomonas hydrophilic colloid and locust bean gum.

To further illustrate my invention there are presented the following examples in which all parts and percentages are by weight unless otherwise indicated.

EXAMPLE I

A tomato aspic was prepared by dry blending 0.65 part of *Xanthomonas campestris* hydrophilic colloid, 0.35 part of locust bean gum, 1 part of sugar, and 0.70 part of salt. After being dry blended to insure homogeniety, the finely divided mixture was added to 97.3 parts of tomato juice. The mixture was then heated to 180° F. and subjected to agitation. After holding at 180° F. for approximately 15 minutes, the mixture was poured into containers and allowed to cool. There resulted a firm, cohesive and heat reversible tomato aspic gel.

Various flavor modifiers may be incorporated in the tomato aspic illustrated in Example I. Illustrative of such modifiers are celery, spices, lemon juice, etc. These modifiers are conveniently added to the tomato juice along with the finely divided Xanthomonas hydrophilic colloid, locust bean gum, sugar, and salt after which the mixture is heated to 180° F. and cooled to give a firm tomato aspic gel.

EXAMPLE II

A dietetic jelly was prepared by dry blending 1.00 part of *Xanthomonas campestris* hydrophilic colloid, 1.00 part of locust bean gum, 1.50 parts of calcium cyclamate, 0.10 part of calcium saccharin and 0.45 part of sodium benzoate. After the dry blending operation, the mixture was added to 450 parts of unsweetened Concord grape juice and then heated to 180° F. with agitation. After holding at 180° F. for approximately 15 minutes, the mixture was poured into containers and allowed to cool. There resulted a tender, smooth, and heat reversible dietetic grape jelly.

EXAMPLE III

To 40 parts of water was added a dry blended mixture comprising 0.25 part of *Xanthomonas campestris* hydrophilic colloid and 0.25 part of locust bean gum. After addition to water, the temperature of the system was raised to approximately 180° F. with agitation. The mixture was then combined with 250 parts of sugar and 250 parts of 4:1 (4 parts of strawberries to 1 part of sugar) pack strawberries which had previously been preheated to 180° F. The resulting mixture was then cooked to a temperature of about 220° F. which yielded a soluble solid content of approximately 64% by weight. Two parts of citric acid were then added and dissolved therein. The mixture was then poured into containers and allowed to cool. On cooling, there resulted a heat reversible strawberry jam of excellent quality.

EXAMPLE IV

To 201 parts of water were added 0.25 part of *Xanthomonas campestris* hydrophilic colloid and 0.25 part of locust bean gum, both in finely divided form. After dissolving these materials in the water, 2.01 parts of a surface active agent were added. Illustrative of suitable surface active agents are the materials which are sold commercially as Pluronic L-44 by Wyandotte Chemical Co. Typical of such surface active agents are the anionic and nonionic materials including, for example, oleic acid amides, alcohol sulfates, alkyl aryl ethers, alkyl aryl sulfonates, and the like. There are then added 0.39 part of sodium orthophenyl phenate (a suitable material for this purpose is offered commercially by Dow Chemical Co. as Dowicide A), 12.3 parts of glycerine, 30.15 parts of a finely divided diatomaceous earth. After these materials are added, the mixture was mixed to insure homogeneity and heated to 140° F. where 47.6 parts of a light mineral oil and 4.2 parts of carnauba wax were added. The temperature was then raised further to 175° F. with stirring until the wax was dissolved in the system. The material was then passed through a colloid mill or homogenizer and poured into containers and allowed to cool. There results an excellent cleaner and polish for auto enamels which exists in the form of a soft gel having excellent suspending and emulsion stability properties.

As set forth previously, the aqueous heat reversible gels produced according to my invention are preferably produced by adding the necessary ingredients, i.e., a Xanthomonas hydrophilic colloid and locust bean gum, to hot water whereupon the gel forms on cooling of the mixture to a temperature below about 125° F. Also, however, the gels which are the subject of my invention can be produced through a cold process in which locust bean gum and a Xanthomonas hydrophilic colloid are added to a cold aqueous system which is then subjected to vigorous agitation and allowed to set. In producing gels through use of a cold process, I generally employ from about 0.10% to about 2% by weight (total) of the Xanthomonas hydrophilic colloid and locust bean gum based on the weight of the aqueous component and, preferably I employ a total concentration in the range of about 0.2% to about 1%.

Gels formed according to my cold process are obtained almost instantaneously under the influence of high shear agitation. It has been found that the gel strength increases to some degree on aging or on further cooling of the gel. Aging or additional cooling is, however, not critical to forming a cold gel according to my invention.

To further illustrate this aspect of my invention there is presented the following example.

EXAMPLE V

To 183 parts of water were added 1.75 parts of *Xanthomonas campestris* hydrophilic colloid, and 1.75 parts of locust bean gum. The mixture was agitated at high shear in a Waring Blendor for 30 seconds. There was then added 4 parts of a surface active agent, as defined previously, such as the product which is sold commercially as Regal H D by Armour and Co., and mixing was continued at a lower speed to minimize foaming. Ten parts of trisodium phosphate were then added and mixing was continued until the trisodium phosphate had dissolved. There resulted an oven cleaner composition which had a high viscosity and a semi-gelatinous body. It was found that the composition could be easily applied to oven surfaces and exhibited excellent "cling" even on vertical surfaces. Further, the gelled structure of the oven cleaner was reversible under the influence of temperature which proved advantageous. To illustrate, after treating the oven surfaces with the cleaner composition, it was not necessary to remove the cleaner in the usual laborious manner along with the dissolved or loosened grease and charred debris. Rather, removal of the oven cleaner was accomplished by simply warming the oven to a temperature of about 150° F. at which temperature the viscosity of the oven cleaner had decreased to the point where a major portion of it drained to the bottom of the oven such that it could be easily removed.

A still further aspect of my invention arises from the discovery that a Xanthomonas hydrophilic colloid and locust bean gum, when present together in an aqueous system, produce a synergistic increase in the viscosity of the aqueous system. When utilizing a mixture of a Xanthomonas hydrophilic colloid with locust bean gum in order to produce a synergistic viscosity increase in an aqueous system, I have found that a synergistic effect is obtained using varying ratios of Xanthomonas hydrophilic colloid to locust bean gum ranging from about 95:5 to about 5:95. A preferred ratio of Xanthomonas hydrophilic colloid to locust bean gum ranges from 80:20 to 20:80 since the synergistic viscosity increase produced within this range is greater than at ratios outside this range. A most preferred ratio comprises about 40 parts by weight of a Xanthomonas hydrophilic colloid for each 60 parts of locust bean gum since the greatest viscosity increase has been observed at weight ratios of this order.

When utilizing a mixture of a Xanthomonas hydrophilic colloid with locust bean gum for the purpose of either producing a cold gel or synergistically increasing the viscosity of an aqueous system, I employ a total concentration of the Xanthomonas hydrophilic colloid and locust bean gum ranging from about 0.10% to about 2% by weight of the aqueous component. Amounts in the range of 0.2% to about 1% by weight of the aqueous component are preferred.

To illustrate the wide range of ratios over which a Xanthomonas hydrophilic colloid and locust bean gum give a synergistic increase in viscosity, a number of aqueous solutions were formulated which contained varying ratios of a Xanthomonas hydrophilic colloid and locust bean gum. The Xanthomonas hydrophilic colloid employed in these tests was formed by the bacterium *Xanthomonas campestris* according to the method described previously with the colloid being separated by drying the clarified mixture resulting from the final fermentation step using a drum dryer which was heated with steam at 40 p.s.i. The dried colloidal material was removed from the surface of the drum with a sharp knife or doctor blade.

In Table IV which follows, the total content of the *Xanthomonas campestris* hydrophilic colloid and locust bean gum employed in each test run was 1% by weight of the total solution. The materials were dry blended and then added to distilled water and stirred for 15 minutes with a disc type stirrer rotating at 900 r.p.m. The disc stirrer comprised a 1¾ in. diameter disc divided into four radial lobes. The lobes were bent from the plane of the disc such that the leading edges of each of the lobes were approximately ⅛ in. below the plane of the disc and the trailing edges of each of the lobes were approximately ⅛ in. above the plane of the disc. Following the stirring, the viscosity was immediately recorded with a Brookfield Viscometer, Model LVF, using a spindle rotating at 60 r.p.m.

TABLE IV

| Parts of *Xanthomonas campestris* colloid | Parts of locust bean gum | Viscosity of solution (cps.) |
| --- | --- | --- |
| 100 | 0 | 470 |
| 95 | 5 | 660 |
| 90 | 10 | 770 |
| 80 | 20 | 1,030 |
| 70 | 30 | 1,260 |
| 60 | 40 | 1,510 |
| 50 | 50 | 1,690 |
| 40 | 60 | 1,860 |
| 30 | 70 | 1,420 |
| 20 | 80 | 1,030 |
| 10 | 90 | 600 |
| 5 | 95 | 360 |
| 0 | 100 | 36 |

As shown in Table IV, a wide range of mixtures of a Xanthomonas hydrophilic colloid with locust bean gum gave a synergistic increase in viscosity. A synergistic increase in viscosity was obtained at weight ratios ranging from 95 parts of a Xanthomonas hydrophilic colloid with 5 parts of locust bean gum to 5 parts o fa Xanthomonas hydrophilic colloid with 95 parts of locust bean gum. The greatest viscosity increase was observed at weight ratios of about 80:20 to about 20:80, and the optimum viscosity increase was observed using approximately 60 parts of locust bean gum for each 40 parts of a Xanthomonas hydrophilc collod.

The test series set forth in Table IV was repeated using the same ingredients and weight ratios and employing higher shear agitation. In this instance, the dry blended materials were added to distilled water which was mixed in a Waring Blendor at high speed for 2 minutes. The results are shown in Table V.

TABLE V

| Parts of Xanthomonas campestris colloid | Parts of locust bean gum | Viscosity of solution (cps.) |
|---|---|---|
| 100 | 0 | 610 |
| 95 | 5 | 820 |
| 90 | 10 | 1,090 |
| 80 | 20 | 2,850 |
| 70 | 30 | 3,300 |
| 60 | 40 | 4,150 |
| 50 | 50 | 4,500 |
| 40 | 60 | 4,750 |
| 30 | 70 | 4,400 |
| 20 | 80 | 3,600 |
| 10 | 90 | 2,200 |
| 5 | 95 | 1,180 |
| 0 | 100 | 61 |

As shown in Table V, the viscosity increase obtained is dependent upon the amount of shear employed in the agitation. It should be noted, however, that the greatest viscosity improvement occurred at weight ratios of 80:20 to 20:80 as observed in Table IV and that the optimum viscosity improvement was observed at a weight ratio of approximately 60 parts of locust bean gum to 40 parts of a Xanthomonas hydrophilic colloid.

To demonstrate the synergistic viscosity increase obtained through mixing locust bean gum with a Xanthomonas hydrophilic colloid, a further series of tests were carried out. In these tests, a wide variety of Xanthomonas hydrophilic colloids were separately added to water and agitated at high shear in a Waring Blendor for 30 seconds. The viscosity determinations were then immediately made by a Brookfield Viscometer, Model LVF, using a spindle speed of 30 r.p.m. The particle size of the Xanthomonas hydrophilic colloids employed and the locust bean gum were such that 100% of the material passed through a 100-mesh screen. The results of these tests are set forth in the following Table VI.

TABLE VI

| Concentration of Xanthomonas hydrophilic colloid | Concentration of locust bean gum (percent) | Viscosity of solution (c.p.s.) |
|---|---|---|
| 1.0% Xanthomonas campestris | 1.0 | 1,800 |
|  |  | 20 |
| 0.5% Xanthomonas campestris | 0.5 | 2,860 |
| 1.0% Xanthomonas malvacearum XM13 |  | 1,280 |
| 0.5% Xanthomonas malvacearum XM13 | 0.5 | 3,800 |
| 1.0% Xanthomonas malvacearum R2 |  | 1,760 |
| 0.5% Xanthomonas malvacearum R2 | 0.5 | 6,400 |
| 1.0% Xantohmonas begoniae S9 |  | 1,560 |
| 0.5% Xanthomonas begoniae S9 | 0.5 | 5,600 |
| 1.0% Xanthomonas begoniae S3 |  | 500 |
| 05.% Xanthomonas begoniae S3 | 0.5 | 3,800 |
| 1.0% Xanthomonas phaseoli |  | 20 |
| 0.5% Xanthomonas phaseoli | 0.5 | 2,000 |
| 1.0% Xanthomonas carotae XCII |  | 1,000 |
| 0.5% Xanthomonas carotae XCII | 0.5 | 4,000 |
| 1.0% Xanthomonas incanae |  | 1,800 |
| 0.5% Xanthomonas incanae | 0.5 | 7,000 |

As shown in Table VI, a wide variety of Xanthomonas hydrophilic colloids were found to produce a synergistic increase in the viscosity of an aqueous solution when added thereto in admixture with locust bean gum. The various Xanthomonas hydrophilic colloids indicated in the table were produced in the manner set forth previously for a *Xanthomonas campestris* hydrophilic colloid with the exception that a different strain of bacterium was employed in the process, the strain of bacterium being indicated in Table VI.

In practicing my invention, I sometimes prefer to employ a Xanthomonas hydrophilic colloid which is prepared by a slightly different method than that set forth previously. This is particularly true in the formation of a gel according to my cold process or in the formation of a synergistically thickened aqueous system through the addition of a Xanthomonas hydrophilic colloid and locust bean gum thereto. In the alternative method for preparing Xanthomonas hydrophilic colloid, the colloidal material is not recovered by precipitation as, for example, in methanol. Rather, the clarified mix resulting from the final fermentation step of the process is dried by the application of heat. To illustrate, the hydrophilic colloidal material can be separated by passing the clarified mixture from the fermentation to a drum dryer which is heated with steam at 40 p.s.i. The dried film on the drum surface can thereafter be removed with a sharp knife or doctor blade. Alternative drying methods may also be employed in separating the hydrophilic colloidal material. Thus, for example, the hydrophilic colloidal material may be separated by subjecting the clarified mixture from the fermentation to spray drying, etc.

The water temperature employed in forming a gel according to a cold process or in forming a synergistically thickened aqueous system according to my invention is not critical. Thus, for example, cold gels can be formed with water of various temperatures such as 45° F. or 75° F. and synergistically thickened aqueous systems can likewise be formed using water of such varying temperatures.

Having fully defined my invention in the foregoing specification, I desire to be limited only by the lawful scope of the appended claims.

I claim:

1. A composition for thickening an aqueous medium or forming a heat reversible, aqueous gel, said composition comprising a Xanthomonas hydrophilic colloid and locust bean gum, wherein the weight ratio of said Xanthomonas hydrophilic colloid to said locust bean gum ranges from about 95:5 to about 5:95.

2. The composition of claim 1 wherein said Xanthomonas hydrophilic colloid is produced by the bacterium *Xanthomonas campestris*.

3. The composition of claim 1 wherein said Xanthomonas hydrophilic colloid is produced by the bacterium *Xanthomonas malvacearum*.

4. The composition of claim 1 wherein said Xanthomonas hydrophilic colloid is produced by the bacterium *Xanthomonas carotae*.

5. The composition of claim 1 wherein said Xanthomonas hydrophilic colloid is produced by the bacterium *Xanthomonas begoniae*.

6. The composition of claim 1 wherein said Xanthomonas hydrophilic colloid is produced by the bacterium *Xanthomonas incanae*.

7. The composition of claim 1 wherein said Xanthomonas hydrophilic colloid is produced by the bacterium *Xanthomonas phaseoli*.

8. The composition of claim 1 wherein said Xanthomonas hydrophilic colloid and said locust bean gum are finely divided such that 100% of the ingredients will pass through a 100-mesh screen.

9. A composition for thickening an aqueous medium or forming a heat reversible, aqueous gel, said composition comprising a Xanthomonas hydrophilic colloid in admixture with locust bean gum, the weight ratio of said Xanthomonas hydrophilic colloid to said locust bean gum ranging between about 80:20 to about 20:80.

10. The composition of claim 9 wherein said Xanthomonas hydrophilic colloid is produced by the bacterium

*Xanthomonas campestris* and the weight ratio between said *Xanthomonas campestris* hydrophilic colloid and said locust bean gum is approximately 40:60.

11. A process comprising adding a mixture of a Xanthomonas hydrophilic colloid and locust bean gum to hot water which is then cooled to form a heat reversible gel, the total quantity of said Xanthomonas hydrophilic colloid and said locust bean gum ranging from about 0.02% to about 4% by weight of the hot water, and the weight ratio of said Xanthomonas hydrophilic colloid to said locust bean gum ranging from about 95:5 to about 5:95.

12. The process of claim 11 wherein said Xanthomonas hydrophilic colloid is produced by the bacterium *Xanthomonas campestris.*

13. The process of claim 11 wherein said Xanthomonas hydrophilic colloid is produced by the bacterium *Xanthomonas malvacearum.*

14. The process of claim 11 wherein said Xanthomonas hydrophilic colloid is produced by the bacterium *Xanthomonas carotae.*

15. A process for preparing a viscous aqueous medium by reacting locust bean gum and a Xanthomonas hydrophilic colloid in said medium, comprising adding locust bean gum and a Xanthomonas hydrophilic coloid to water, wherein said Xanthomonas hydrophilic colloid and said locust bean gum are employed at a total concentration ranging from about 0.10% to about 2.0% by weight of the aqueous medium, and the weight ratio of said Xanthomonas hydrophilic colloid to said locust bean gum ranges from about 95:5 to about 5:95.

16. The process of claim 15 wherein said Xanthomonas hydrophilic colloid is produced by the bacterium *Xanthomonas campestris.*

17. A viscous aqueous medium comprising water containing a mixture of a Xanthomonas hydrophilic colloid and locust bean gum, wherein said locust bean gum and Xanthomonas hydrophilic colloid are present at a total concentration ranging from about 0.10% to about 2% of the aqueous medium, and the weight ratio of said Xanthomonas hydrophilic colloid to said locust bean gum ranges from about 95:5 to about 5:95.

18. The composition of claim 17 wherein said Xanthomonas hydrophilic colloid is produced by the bacterium *Xanthomonas campestris.*

19. The composition of claim 17, wherein said Xanthomonas hydrophilic colloid is produced by the bacterium *Xanthomonas begoniae.*

20. A process for preparing a heat reversible aqueous gel, said process comprising adding to water a Xanthomonas hydrophilic colloid and locust bean gum and mixing under high shear agitation to produce a heat reversible aqueous gel, wherein said Xanthomonas hydrophilic colloid and said locust bean gum are employed at a total concentration ranging from about 0.10% to about 2% by weight of the aqueous medium and the weight ratio of said Xanthomonas hydrophilic colloid to said locust bean gum ranges from about 5:95 to about 95:5.

21. The process of claim 20, wherein said Xanthomonas hydrophilic colloid is produced by the bacterium *Xanthomonas campestris.*

References Cited

UNITED STATES PATENTS

| | | | |
|---|---|---|---|
| 2,466,146 | 4/1949 | Baker | 252—316X |
| 2,639,268 | 5/1953 | Heiss | 252—316X |
| 2,927,055 | 3/1960 | Lanzet | 252—316X |
| 3,020,206 | 2/1962 | Patton et al. | 195—31 |

OTHER REFERENCES

"New Polysaccharide Gums Produced by Microbial Synthesis," Manufacturing Chemist, vol. 31, May, 1960, pp. 206–208.

RICHARD D. LOVERING, Primary Examiner

U.S. Cl. X.R.

99—131, 139, 144; 106—5; 252—135

PO-1050
(5/69)

UNITED STATES PATENT OFFICE
CERTIFICATE OF CORRECTION

Patent No. 3,557,016        Dated January 19, 1971

Inventor(s)     HARRY R. SCHUPPNER, JR.

It is certified that error appears in the above-identified patent and that said Letters Patent are hereby corrected as shown below:

In line 47, column 1, the word "gelation" should read --gelatin--.

In line 5, column 2, the word appearing as "locus" shou read --locust--.

In Table VI, the bracket "{" should be deleted and the number "1.0" appearing next to the bracket should be moved down one line to the same line as the number "20" in the la column. With this change, the upper portion of Table VI wi read as follows:

--

TABLE VI

| CONCENTRATION OF XANTHOMONAS HYDROPHILIC COLLOID | CONCENTRATION OF LOCUST BEAN GUM (Percent) | VISCOSIT SOLUTION (c.p.s. |
|---|---|---|
| 1.0% Xanthomonas campestris |  | 1,800 |
|  | 1.0 | 20 |

Signed and sealed this 10th day of August 1971.

(SEAL)
Attest:

EDWARD M. FLETCHER, JR.        WILLIAM E. SCHUYLER, J
Attesting Officer        Commissioner of Patent